(12) United States Patent
Shekhtman

(10) Patent No.: US 6,549,877 B1
(45) Date of Patent: Apr. 15, 2003

(54) METHOD AND APPARATUS FOR DATA ACQUISITION AND PROCESSING

(76) Inventor: Alexander Z. Shekhtman, Harvest Station, Irvine, CA (US) 92614

( * ) Notice: Subject to any disclaimer, the term of this patent is extended or adjusted under 35 U.S.C. 154(b) by 172 days.

(21) Appl. No.: 09/706,902

(22) Filed: Nov. 6, 2000

(51) Int. Cl.$^7$ .............................................. G06F 19/00
(52) U.S. Cl. .................................... 702/189; 702/190
(58) Field of Search ............................... 702/189, 119, 702/123, 190

(56) References Cited

U.S. PATENT DOCUMENTS

| | | | |
|---|---|---|---|
| 5,764,546 A | | 6/1998 | Bryant et al. |
| 6,067,584 A | | 5/2000 | Hayles et al. |
| 6,166,673 A | * | 12/2000 | Odom ........................ 341/155 |
| 6,249,125 B1 | * | 6/2001 | Haddad et al. ............. 320/116 |
| 6,349,274 B1 | * | 2/2002 | Kay et al. ..................... 703/13 |
| 6,366,862 B1 | * | 4/2002 | Qian et al. .................. 702/147 |
| 6,405,145 B1 | * | 6/2002 | Rust et al. .................. 702/121 |
| 2001/0035879 A1 | * | 11/2001 | Washington et al. ........ 345/763 |

OTHER PUBLICATIONS

Stoukatch, "Analysis of Control Systems with Delay Using of Differential Transformations Method", IEEE, Sep. 2000.*

* cited by examiner

Primary Examiner—Patrick Assouad

(57) ABSTRACT

A method, providing the acquired data characteristic transformation, is realized by an apparatus, comprising a main controller connected to a data controller, a calculator, including a data processor and a data characteristic converter providing an intermediate data characteristic transformation, a memory, a graphical data forming device, a graphical data scaling device respectively connected to each other, to calculator, to main and data controllers, and to an interface, a display and a printer.

10 Claims, 6 Drawing Sheets

METHOD AND APPARATUS FOR DATA ACQUISITION AND PROCESSING

FIELD OF THE INVENTION

This invention relates to data acquisition and processing systems, and more particularly to a data acquisition and processing apparatus and method, configuring the resulting information.

BACKGROUND OF THE INVENTION

Scientists and engineers often use the data acquisition systems to perform a variety of functions, including laboratory and analytical researches, monitoring and control processes, data logging, test and analysis of physical processes, and control of mechanical machinery or electrical/electronic devises, etc. A data acquisition system mostly includes transducers, amplifiers and other means for provision of the signal representation by their measurement and/or monitoring. For example, sensing devices are used to detect the inputting and/or outputting signals. For example, for acquiring analog input signals from a television set, the application may call functions of the device interface software to configure the values of the trigger level, sample rate, and upper and lower input voltage levels of the data acquisition device.

The device by U.S. Pat. No. 6,067,584 provides a data acquisition system comprising attribute-based on an application programming interface (API). The described method includes the step of setting values of the attributes.

According to this patent, the data acquisition system comprises the transducers, providing the field signals representing an equipment being monitored or measured, etc. to the DAQ device 20, a signal conditioning circuitry 22, a central processing unit (CPU), a memory (such as magnetic media or floppy disk), a hard drive, a serial port or parallel port, an attribute setting means, a signal conditioning circuitry 22 including the signal conditioning modules for amplifying, multiplexing and isolating field signals, and a power supply. The DAQ device 20 is configured to acquire or generate signals of distinct I/O types.

The I/O types comprise analog input signals, analog output signals, digital input signals, digital output signals and counter/timer inputs and outputs. The analog input and output signals are received and generated, respectively, on analog "channels" of the DAQ device 20. The digital input and output signals are received and generated, respectively, on digital I/O "ports" of the DAQ device 20. Each channel, port or counter has an associated number which uniquely identifies it with respect to the DAQ device 20 on which it resides.

Such systems do not provide the possibility to research the physical processes of the acquired signals and their phenomena.

Some data acquisition devices usually include, inter alia, low-level device drivers for communication. Another device by U.S. Pat. No. 5,764,546 comprises a data acquisition channel configuration system and method, referred to as the data acquisition Channel Wizard, for facilitating the creation of data acquisition applications. The present invention enables the user to create channel configurations which include information regarding a respective data acquisition and processing hardware channel, such as the physical phenomena being measured/generated and how the phenomena being converted to units which can be measured/generated. The user assigns a name to each respective channel configuration. The method for configuring one or more channels on a data acquisition device comprises receiving at least one channel configuration specification from a user and assigning a name to the channel configuration in response to user input. For analog I/O, receiving the channel configuration specification preferably comprises receiving and storing input from a user regarding units and range of a physical quantity being measured/generated, how the physical quantity is being converted to units which can be measured/generated, and a selected channel of a data acquisition device. For digital I/O, receiving the channel configuration specification comprises receiving and storing input from a user regarding a signal type that is being acquired/generated and the selected port/line of the data acquisition device. For digital I/O, the user can also specify an initial value of an output and an invert signal option. The data acquisition Channel Wizard displays various panels in a configuration window to enable the user to specify the respective channel configuration. The data acquisition Channel Wizard assigns a name to the channel configuration in response to user input.

The DAQ system 100 comprises a DAQ Channel Wizard, providing the channel configurations based on user input, a bus, a serial port or a parallel port, a transducers 106 and other detecting means which provide field electrical signals to/from the DAQ device and a signal conditioning logic 108 including a signal conditioning extension means. The signal conditioning extension means comprises an external chassis housing signal conditioning modules for amplifying, multiplexing, and isolating field signals.

According to the mentioned patent, a channel configuration is a collection of user-defined information associated with a selected DAQ channel. Using this information, the user can configure the hardware to measure an information from a sensor or drive the actuator.

Thus, there is a great need in the art for data acquisition and processing of the acquired parameters by characteristic transformation providing possibility to research the physical processes/phenomena of the acquired parameters.

OBJECT AND ADVANTAGES OF THE INVENTION

Accordingly, several objects and advantages of the present invention are to provide an improved method and apparatus for data acquisition and processing.

It is another object of the invention to provide an improved method and apparatus for data acquisition and processing with characteristic transformation of the acquired data for research of the phenomena presented by this data.

It is still another object of the invention to provide the decreasing of the acquired and formed data processing time for the phenomena research.

Still, further objects and advantages will become apparent from a consideration of the ensuing description accompanying drawings.

DESCRIPTION OF THE DRAWING

In order that the invention and the manner in which it is to be performed may be more clearly understood, embodiments thereof will be described by way of example with reference to the attached drawings, of which.

SUMMARY OF THE INVENTION

The improved method and apparatus are intended for data acquisition and processing. The improved method, providing the characteristic transformation of the acquired data, is realized by an improved apparatus, comprising a main control means, a data control means, a calculation means, including a data processing means and a data characteristic transformation means, a memorizing means, a graphical data forming means, a graphical data scaling means and a terminal means respectively connected to each other.

DESCRIPTION OF THE PREFERRED EMBODIMENTS

Here the description of an improved method and apparatus will be done in statics (as if the blocks of the improved apparatus are suspended in the space) with description of their relative connections to each other. The description of the improved processes and functional operations of an improved apparatus will be done hereinafter.

Figure 1:
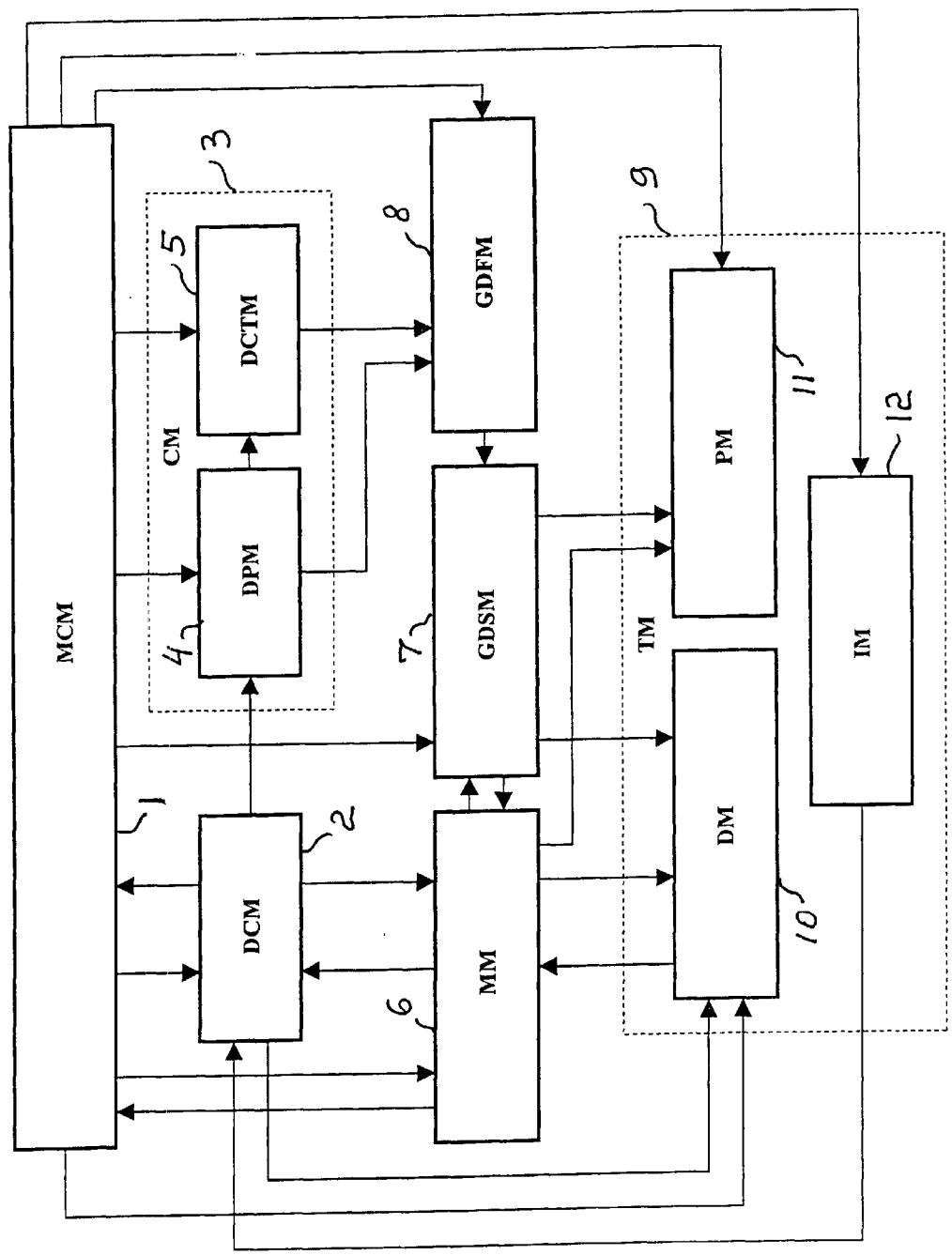
FIG. 1 is a structural block-scheme of the first variant of the improved apparatus.

Referring to FIG. 1, an improved apparatus, includes a main control means 1 (MCM) connected to a data control means 2 (DCM), to a data processing means 4 (DPM) of a calculation means 3 (CM) and to a data characteristic transformation means 5 (DCTM) of the calculation means 3. The data processing means 4 and the data characteristic transformation means 5 are connected to each other. The data control means 2 is connected to the data processing means 4 of the calculation means 3 and to a memorizing means 6 (MM), which is connected to the main control means 1 and to the graphical data scaling means 7 (GDSM). The main control means 1 is also connected to a graphical data scaling means 7 and to a graphical data forming means 8 (GDFM). The graphical data forming means 8 is connected to the graphical data scaling means 7, to the data processing means 4 and to the data characteristic transformation means 5 of the calculation means 3.

The terminal means 9 (TM), includes a displaying means 10 (DM), a printing means 11 (PM) and an interface means 12 (IM). The terminal means 9 can also comprise a floppy disk means and a compact disc means, which are not shown on FIG. 1. The displaying means 10 of the terminal means 9 is connected to the memorizing means 6, to the main control means 1, to the data control means 2 and to the graphical data scaling means 7, which is connected to the printing means 11. The data control means 2 is connected to the interface means 12 of the terminal means 9. The printing means 11 of the terminal means 9 is also connected to the memorizing means 6 and to the main control means 1, which is connected to the interface means 12. The means such as the data processing means 4 and data characteristic transformation means 5 of the calculation means 3, graphical data forming means 8, graphical data scaling means 7, and also the displaying means 10 and printing means 11 of the terminal means 9 can have their own co-controlling and co-processing means (not shown).

Figure 2:
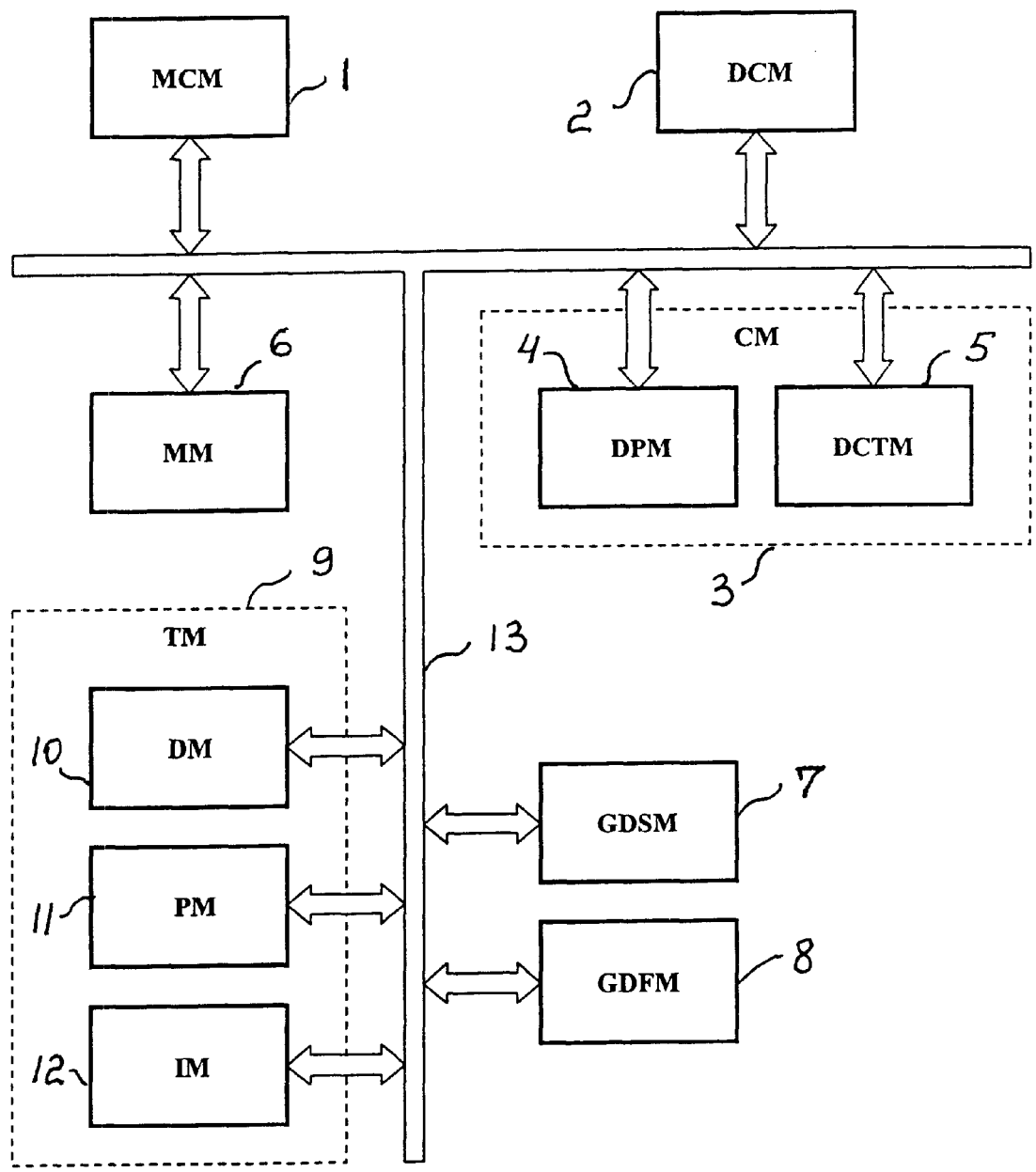
FIG. 2 is a structural block-scheme of the second variant of the improved apparatus.

According to FIG. 2, the main control means 1, data control means 2, data processing means 4 and data characteristic transformation means 5 of the calculation means 3, memorizing means 6, graphical data forming means 8, graphical data scaling means 7 and terminal means 9, including the displaying means 10, printing means 11 and interface means 12, are respectively connected to each other via a multiplexed bus 13. The connection of the mentioned above means can be provided by a data bus (not shown) and an address bus (not shown) instead of the multiplexed bus 13.

The improved method and apparatus operate as follows below. The data control means 2 acquires from the interface means 12 the information (data) and by the command(s) following from the main control means 1 appropriately distributes the acquired data to the executive means, such as data processing means 4 and data characteristic transformation means 5 of the calculation means 3, memorizing means 6, graphical data forming means 8, graphical data scaling means 7, and to displaying means 10 and printing means 11 of the terminal means 9. Additionally, the data control means 2 provides the possibility of the correction of the errors in the new input data or recorded data, which is earlier recorded and contained in the memorizing means 6. The data control means 2 also provides the possibility to combine the acquired data (new input data) with the data contained in the memorizing means 6. The new input or recorded data can be observed on the displaying means 10 and/or printed by the printing means 11 of the terminal means 9. The information can follow to the data control means 2 from the floppy disk means and/or compact disc means, which are not shown. The initial (new input) or recorded data by the commands of the main control means 1 follows from the data control means 2 to the data processing means 4 of the calculation means 3. The data processing means 4 provides pre-processing (initial processing) of the initial data, forming a preprocessed data, and calculation of the intermediate data in compliance with the selected task. The calculated data (the intermediate data) from the data processing meant 4 follows to the data characteristic transformation means 5 of the calculation means 3, where the characteristic transformation of the intermediate data is provided.

The characteristically transformed data by the command from the main control means 1 follows to the graphical data forming means 8, where the data acceptable for displaying is formed. Then this data follows to the graphical data scaling means 7, where the formed data can be changed in accordance with the selected presentation parameter. The formed and scaled graphical data can be displayed in the plane image (XY coordinate system) and/or spatial image (XYZ coordinate system) on the displaying means 10 of the terminal means 9. The graphical data forming means 8 also provides the forming of the alphabet-numerical data with possibility to scale such data by the graphical data scaling means 7. The formed and scaled alphabet-numerical and/or graphical data (accomplished data) follows to the terminal means 9, where it can be displayed on the displaying means 10 and/or printed by printing means 11. After that the formed data or the formed data combined with the data contained in the memorizing means 6 can repeatedly be scaled in the graphical data scaling means 7 and again directed to the terminal means 9. It can also be directed to the memorizing means 6, to be recorded. By the command of the main control means 1, the data processing cycle, above described, can be repeated with the current, new input or recorded initial data the iteration (a specification of a variable parameter(s) in a multi-repeated cycle on each step of its repetition) can be provided for the same task or for the specified task. The final data (final graphical and/or alphabet-numerical information) follows to the terminal means 9, where it can be displayed on the displaying means 10 or printed by the printing means 11. During the data processing (functional processing), the selected data (the options of the data processing) from the data control means 2 follows through the main control processing means 4 and data characteristic transformation means 5 of the calculation means 3, to the memorizing means 6, to the graphical data forming means 8 and to the graphical data scaling means 7.

The improved data acquisition and processing method can mathematically be described by the following equation:

$$F_{Q,f}(\alpha, \beta(\alpha, t), t) = (1/Q(\alpha, \beta(\alpha, t), t)) \times T_{v,f(v)}(Q(\alpha, \beta(\alpha, t), t)) \quad [1]$$

wherein $F_{Q,f}$—a characteristic function (a transformed data); $\alpha$, $\beta$, t—arguments; $Q(\alpha, \beta(\alpha, t), t)$—a studied quantity/function (an intermediate data); v—a set of arguments from the arguments $\alpha$, $\beta$, t; $T_{v,f(v)}$—a differential transformation with derivatives with respect to some arguments from v; f(v)—an eigen-function of $T_{v,f(v)}$; $T_{v,f(v)}(Q(\alpha, \beta(\alpha, t), t)$—the image of $Q(\alpha, \beta(\alpha, t), t)$ by the transformation $T_{v,f(v)}$.

In the equation [1], the argument $\alpha$ is a parameter of a studied influence. The argument $\beta$ is a response of the studied process/system to the studied influence (the response is calculated on the basis of some measured characteristic of the studied process/system). The argument t is the time of the process/system study. The improved method provides acquisition, definition and processing of the transformations $T_{v,f(v)}$ for a plurality of functions f(v). For example, if f(v) is a logarithmic function $\lambda \log(\alpha)$, where $\lambda$ is an arbitrary constant, the transformation $T_{v,f(v)}$ can be presented as ( ... )$\alpha(\partial/\partial\alpha)$( ... ), where the symbol ( ... ) represents the transformed function and $\partial$ is the partial derivative symbol. The improved method can provide the processing of the arguments $\alpha$ and $\beta$ as the vectorial quantities.

The improved data acquisition and processing method can mathematically be also described by the following equation:

$$F_{Q,f}(\alpha_1, \alpha_2, \ldots, \alpha_n) = (1/Q(\alpha_1, \alpha_2, \ldots, \alpha_n)) \times T_{v,f(v)}(Q(\alpha_1, \alpha_2, \ldots, \alpha_n)) \quad [2]$$

wherein $\alpha_1, \alpha_2, \ldots, \alpha_n$—arguments, $Q(\alpha_1, \alpha_2, \ldots, \alpha_n)$—a studied quantity/function (an intermediate data); and the remain designations are the same as in the equation [1].

According to the equation [2], the characteristic function $F_{Q,f}$ of the studied function $Q(\alpha_1, \alpha_2, \ldots, \alpha_n)$ with respect to some function f(v) is the image of the studied function by the transformation, which is a characteristic for the function f(v) in the sense, that this characteristic transformation turns f(v) into a constant.

The improved data acquisition and processing method can mathematically be also described by the following equation:

$$F_{Q,f,g}(\alpha_1, \alpha_2, \ldots, \alpha_n) = T_{v,f(v),g(v)}(Q(\alpha_1, \alpha_2, \ldots, \alpha_n)) \quad [3]$$

wherein $F_{Q,f,g}$—a determining function; $\alpha_1, \alpha_2, \ldots, \alpha_n$—arguments, $Q(\alpha_1, \alpha_2, \ldots, \alpha_n)$—a studied quantity/function (an intermediate data); v—a set of arguments from the arguments $\alpha_1, \alpha_2, \ldots, \alpha_n$; f(v) and g(v)—some functions, $T_{v,f(v),g(v)}$—the transformation which turns the function f(v) into the function g(v); $T_{v,f(v),g(v)}(Q(\alpha_1, \alpha_2, \ldots, \alpha_n))$—the image of $Q(\alpha_1, \alpha_2, \ldots, \alpha_n)$ by the transformation $T_{v,f(v),g(v)}$.

The improved method can define the suitable characteristic function for a studied quantity/function (an intermediate data) based on the data recorded in the memorizing means 6 and calculated by the calculation means 3 in compliance with the one of the equations [1–3].

Figure 4A:
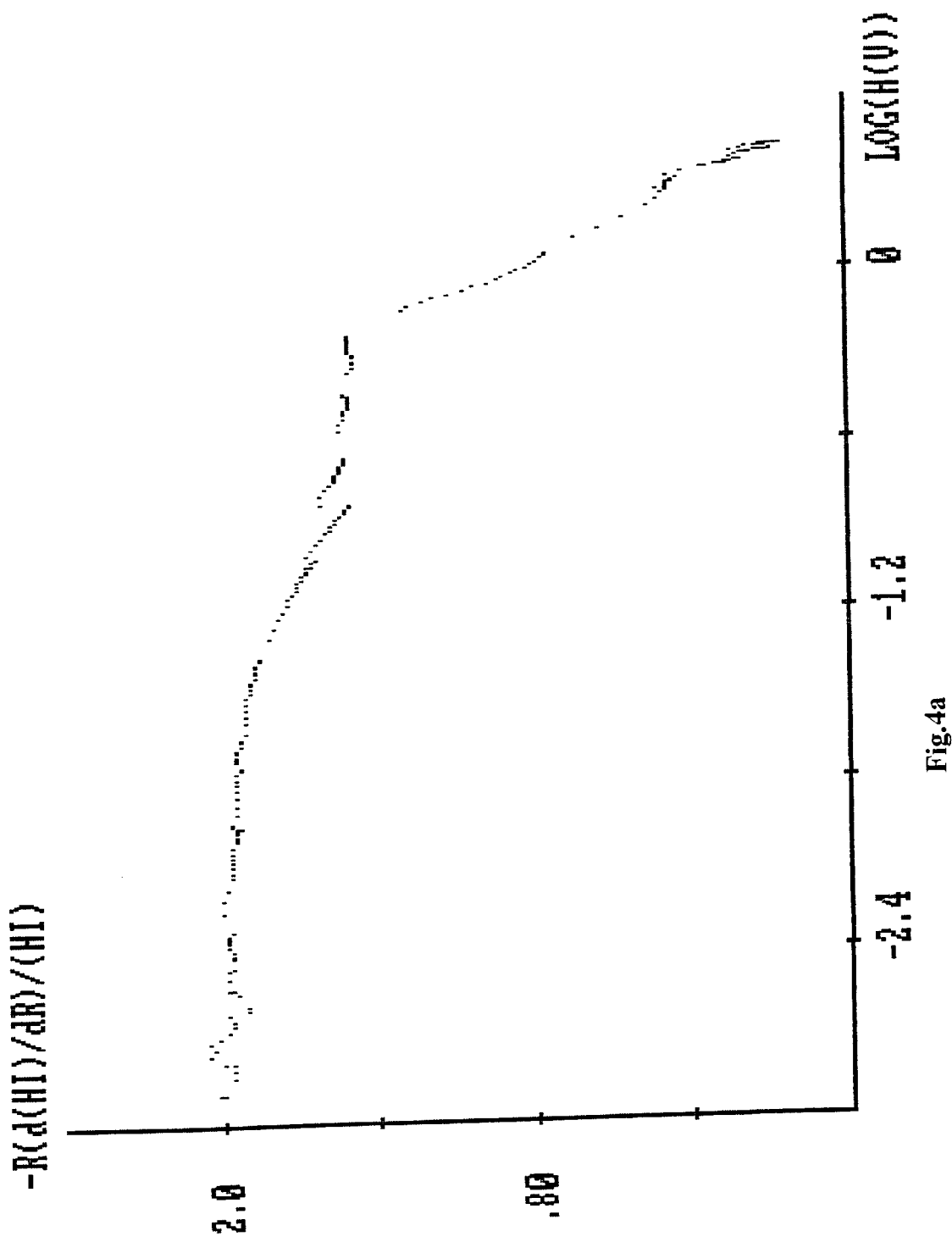
FIGS. 4a–4c are the diagrams of the researched phenomena.
Figure 4B:
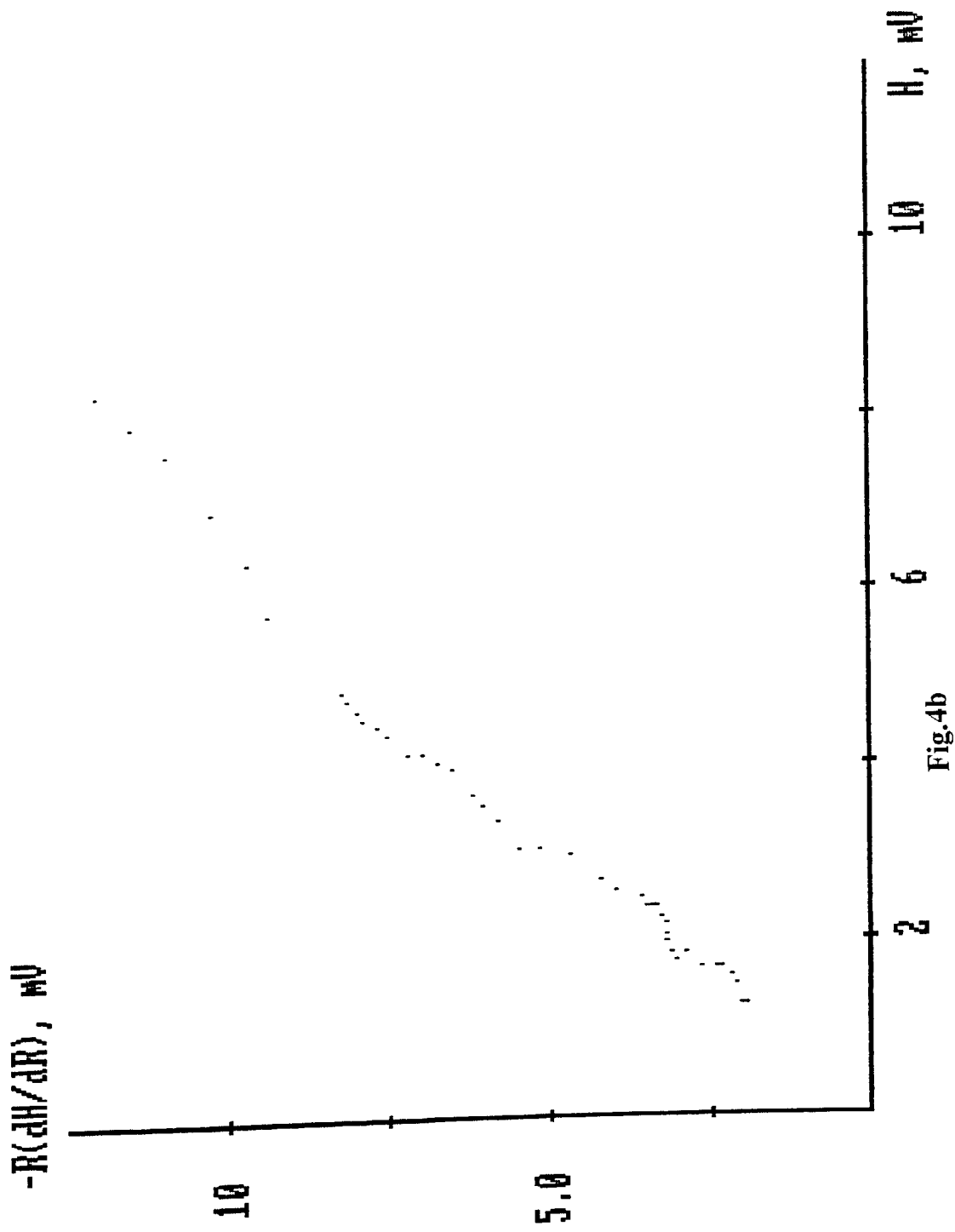
Figure 4C:
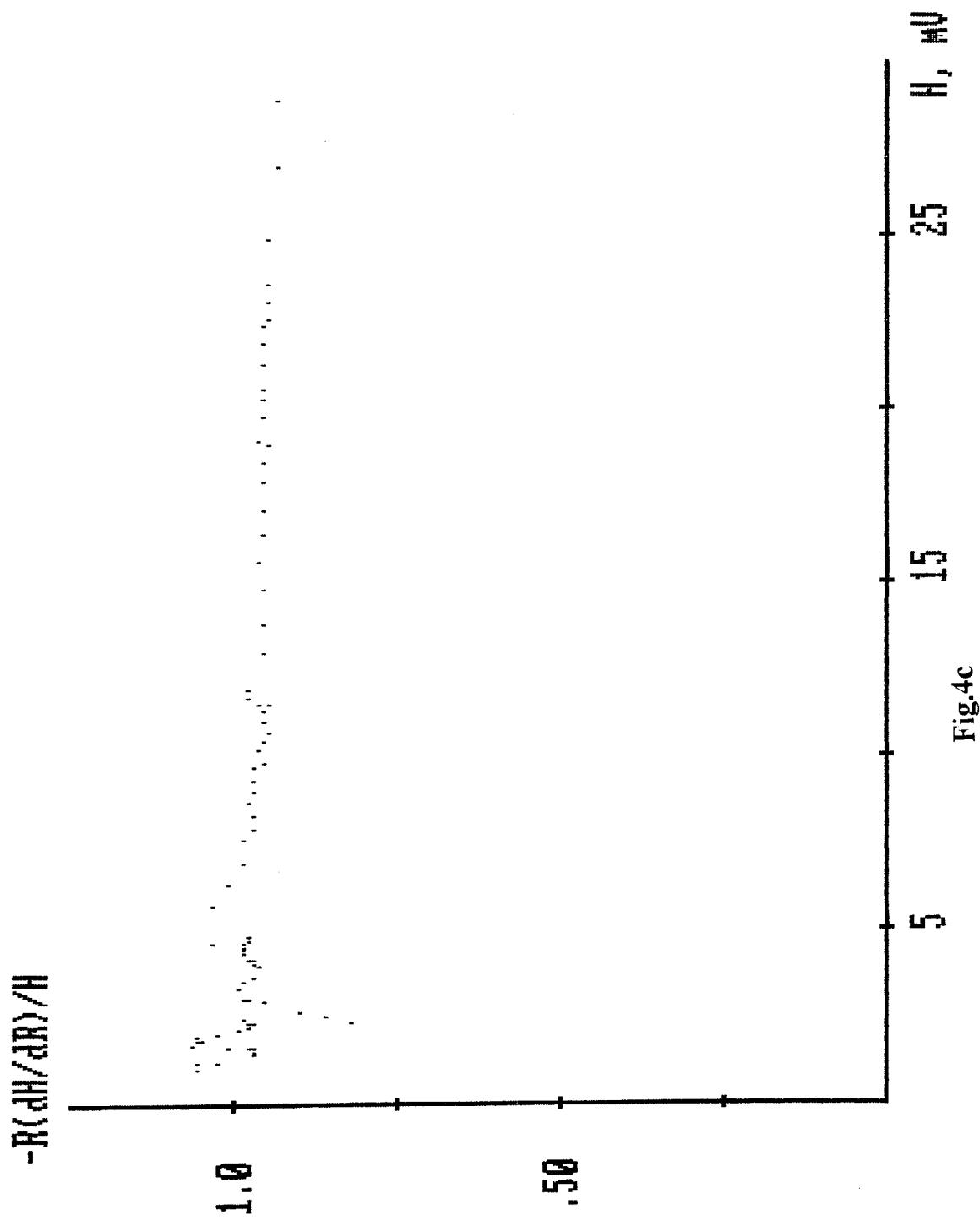

On FIGS. 4a–4c are shown the examples of the data acquisition and data processing results applicable to the electrochemical phenomena of the battery discharge. FIGS. 4a–4c illustrate the lithium battery discharge phenomena, researched by the improved method realized by the improved apparatus. FIG. 4a represents the lithium battery discharge processes in compliance with $-R\{\partial(H \times I)/\partial R\}/(H \times I) = f_1(\log H)$, wherein R—a battery load resistance, H—a battery polarization in volts (V), I—a discharge current, $f_1$—a function symbol, $\partial$—a differential symbol.

FIG. 4b illustrates the lithium battery discharge processes in compliance with $-R(\partial H/\partial R) = f_2(H)$, wherein H—a battery polarization in mV, $f_2$—a function symbol.

FIG. 4c illustrates the lithium battery discharge processes in compliance with $-R(\partial H/\partial R)/H = f_3(H)$, wherein H—a battery polarization in mV, $f_3$—a functional symbol.

The flat or quasi-flat sections in the diagrams of the characteristic functions on FIGS. 4a–4c are the signs of the certain function dependency and one of the visual and convenient criteria of the optimal selection of the parameters, characterizing the studied process/phenomenon. For instance, two flat sections on the diagram of FIG. 4a show that the quantity H×I has (in these sections) the power dependence on 1/R with the different value of the power index. The stepped dependence on the diagram of FIG. 4b shows that the quantity H has sections with the logarithmic dependence on 1/R in the region of small battery polarization H. The absence of the flat area in the very small battery polarization region H on the diagram of FIG. 4c shows that the battery medium between electrodes undergoes some significant changes in the beginning of a battery discharge.

Figure 3:
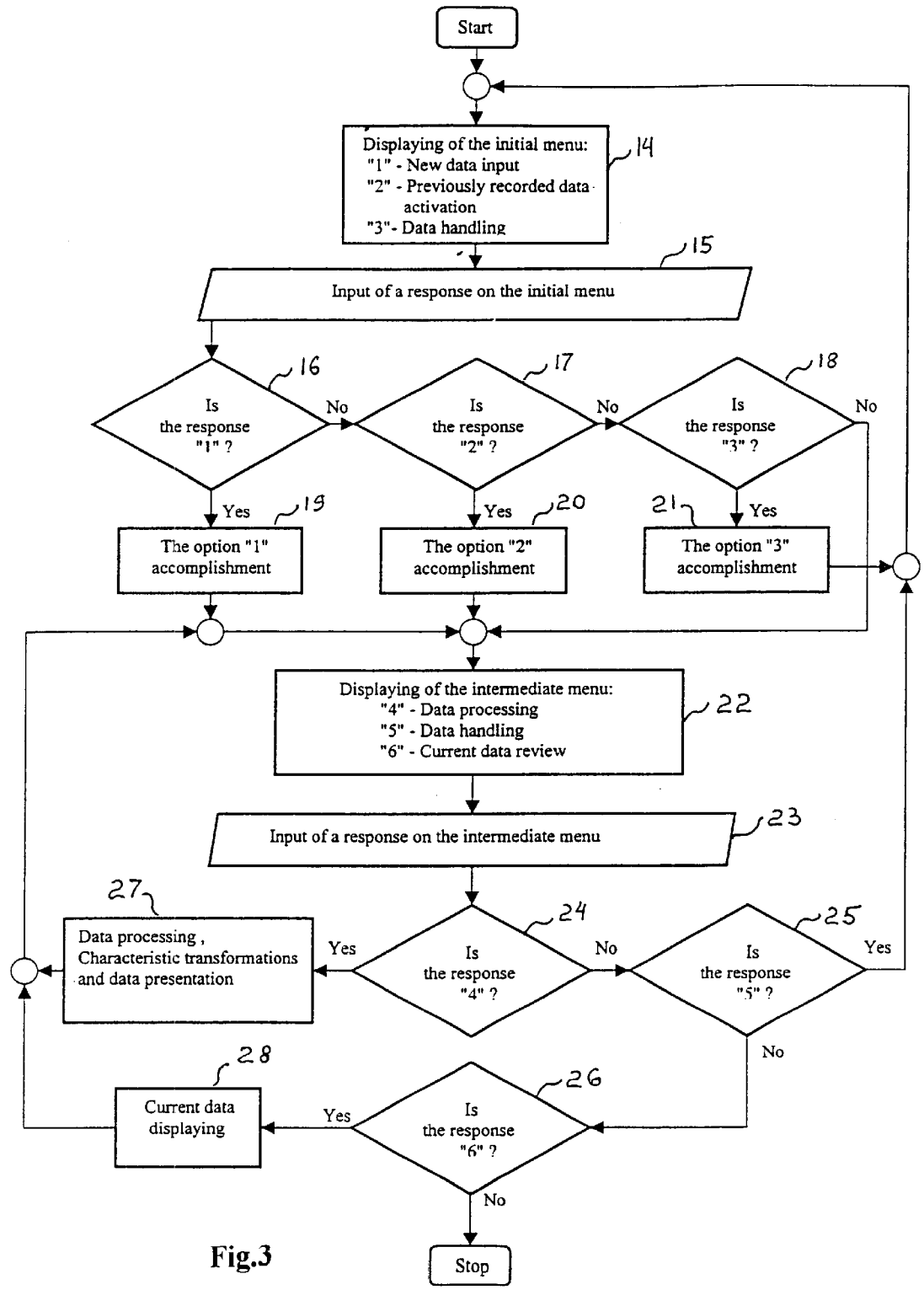
FIG. 3 is a simplified flow chart of the improved apparatus operation.

The improved method and apparatus operation can additionally be explained in accordance with the apparatus operation flow chart (algorithm) presented on FIG. 3. Referring to FIG. 3, the displaying 14 (on the displaying means 10) of the initial menu contained in the memorizing means 6 is provided by the main control means 1. After response on the initial menu in step 15 is implemented (by the interface means 12, main control means 1 and data control means 2), the main control means 1, data control means 2 and memorizing means 6 provide the analyzing of the selected response identification by steps 16, 17, 18 and their accomplishment by steps 19, 20, 21 respectively. The intermediate menu of the further operation, initiated by the main control means 1 and memorizing means 6, is displayed by step 22 on the displaying means 10. After response on the intermediate menu in step 23 is implemented (by the interface means 12, main control means 1 and data control means 2), the main control means 1, data control means 2 and memorizing means 6 provide the analyzing of the selected response identification by steps 24, 25, 26 and their accomplishment 27, 14, 28 respectively. At the positive ("yes") identification of the step 24, the signals, characterizing the selected response, follow to the main control means 1, data control means 2, memorizing means 6, calculation means 3, graphical data forming 8 and scaling 7 means for the data processing, characteristic transformations, forming and scaling of the graphical data, and presentation by step 27. At other selection, the current data or the initial menu are by step 28 or 14 respectively displayed on the displaying means 10.

CONCLUSION, RAMIFICATION AND SCOPE

Accordingly the reader will see that, according to the invention, I have provided the method and apparatus for the acquisition and processing of the complex data. The improved method and apparatus provide the characteristic transformation (processing) of the acquired data. The improved method provides the definition of the suitable characteristics for a studied phenomenon and reduces the number of the parameters, characterizing the phenomenon. Also the improved method, creating the characteristics and images during the data processing, provides an extremely visual informativeness and the way to study the researched processes/phenomena, and reduces the data processing time.

While the above description contains many specificities, these should not construed as limitations on the scope of the invention, but as exemplification of the presently-preferred embodiments thereof. Many other ramifications are possible within the teaching to the invention. For example, an improved method and apparatus provide possibility to study (to process) the acquired signals (data), characterizing the magnetic mediums and biological phenomena, or data on the different devices operation at the different conditions, etc.

Thus, the scope of the invention should be determined by the appended claims and their legal equivalents, and not by examples given.

What is claimed is:

1. A method for data acquisition and processing including the steps of:

acquiring the initial information, providing a correction of error into the acquired information;

pre-processing said initial information, providing a forming of a pre-processed data, control commands and appropriate distribution of said pre-processed data and said control commands;

selecting a task for functional processing of said pre-processed data;

calculating an intermediate data for the selected task;

providing a characteristic transformation of said intermediate data, forming a transformed data, and wherein said characteristic transformation is determined by:

$F_{Q,f}$—a characteristic function;
$T_{v,f(v)}$—a differential transformation;
$f(v)$—an eigen-function of $T_{v,f(v)}$;
$\alpha, \beta, v, t$—the arguments;
$Q(\alpha, \beta(\alpha, t), t)$—a studied quantity;
$T_{v,f(v)}(Q(\alpha, \beta(\alpha, t), t))$—the image of $Q(\alpha, \beta(\alpha, t), t)$ by the transformation $T_{v,f(v)}$, using the equation $$F_{Q,f}(\alpha, \beta(\alpha, t), t) = (1/Q(\alpha, \beta(\alpha, t), t)) \times T_{v,f(v)}(Q(\alpha, \beta(\alpha, t), t));$$

functional processing said pre-processed data for the selected task, configuring said intermediate data and said transformed data;

forming a final data, representing the selected task.

2. The method of claim 1, wherein said pre-processing provides a combining of said initial information with a memorized data.

3. The method of claim 1, wherein said functional processing provides an iteration of said characteristic transformation.

4. The method of claim 1, wherein said functional processing provides an iteration of said intermediate data.

5. The method of claim 1, wherein said final data is presented in a graphical form.

6. The method of claim 5, wherein said final data further is presented in an alphabet-numerical form.

7. An apparatus for data acquisition and processing includes:

a data control means connected to a main control means;

a calculation means, comprising a data processing means and a data characteristic transformation means connected to each other and to said main control means, and wherein said data processing means is connected to said data control means;

a memorizing means connected to said data control means and to said main control means;

a graphical data forming means connected to said main control means and to said data processing means and said data characteristic transformation means of said calculation means;

a graphical data scaling means connected to said main control means, to said memorizing means and to said graphical data forming means;

a terminal means, comprising a display means connected to said data control means, to said main control means, to said memorizing means, to said graphical data scaling means, a printing means connected to said main control means, to said memorizing means and to said graphical data scaling means and an interface means connected to said data control means and to said main control means.

8. The apparatus of claim 7, wherein the connection of said data control means, said main control means, said data processing means and said data characteristic transformation means of said calculation means, said memorizing means, said graphical data forming means, said graphical data scaling means, said display means, said printing means and said interface means of said terminal means further is provided by a multiplexed bus.

9. The apparatus of claim 7, wherein the connection of said data control means, said main control means, said data processing means and said data characteristic transformation means of said calculation means, said memorizing means, said graphical data forming means, said graphical data scaling means, said display means, said printing means and said interface means of said terminal means further is provided by a data bus and an address bus.

10. The apparatus of claim 7, wherein said terminal means further includes at least one of a floppy disc means and a compact disc means.

* * * * *